(12) United States Patent
Hammer et al.

(10) Patent No.: US 11,648,518 B2
(45) Date of Patent: May 16, 2023

(54) CATALYTIC REACTOR WITH FLOATING PARTICLE CATCHER

(71) Applicant: Haldor Topsøe A/S, Kgs. Lyngby (DK)

(72) Inventors: Marc Nybo Hammer, Taastrup (DK); Klaus Risbjerg Jarlkov, Køge (DK); Rasmus Asker Calundann, Holte (DK)

(73) Assignee: Topsoe A/S, Kgs. Lyngby (DK)

( * ) Notice: Subject to any disclaimer, the term of this patent is extended or adjusted under 35 U.S.C. 154(b) by 45 days.

(21) Appl. No.: 17/610,289

(22) PCT Filed: Jun. 19, 2020

(86) PCT No.: PCT/EP2020/067178
§ 371 (c)(1),
(2) Date: Nov. 10, 2021

(87) PCT Pub. No.: WO2020/260157
PCT Pub. Date: Dec. 30, 2020

(65) Prior Publication Data
US 2022/0212155 A1 Jul. 7, 2022

(30) Foreign Application Priority Data
Jun. 27, 2019 (DK) .............. PA 2019 00790

(51) Int. Cl.
*B01J 4/00* (2006.01)
*B01J 8/00* (2006.01)
*B01J 8/02* (2006.01)
*B01J 19/00* (2006.01)
*B01J 19/24* (2006.01)

(52) U.S. Cl.
CPC ............ *B01J 8/0085* (2013.01); *B01J 8/0065* (2013.01); *B01J 8/0278* (2013.01); *B01J 2208/00654* (2013.01); *B01J 2208/00752* (2013.01); *B01J 2208/00938* (2013.01)

(58) Field of Classification Search
CPC ........ B01J 4/00; B01J 4/001; B01J 8/00; B01J 8/0015; B01J 8/003; B01J 8/004; B01J 8/005; B01J 8/006; B01J 8/0065; B01J 8/007; B01J 8/008; B01J 8/0085; B01J 8/02; B01J 8/0278; B01J 2208/00; B01J 2208/00008; B01J 2208/00654; B01J 2208/00743; B01J 2208/00752; B01J 2208/00796; B01J 2208/00893; B01J 2208/00938; B01J 2219/00;
(Continued)

(56) References Cited

U.S. PATENT DOCUMENTS 3,489,529 A 1/1970 Dudych et al.
10,159,950 B2 12/2018 Risbjerg Jarlkov et al.
(Continued)

FOREIGN PATENT DOCUMENTS

EP 0 358 923 A1 3/1990
EP 3037164 A1 * 6/2016 ............. B01D 45/00
(Continued)

*Primary Examiner* — Natasha E Young
(74) *Attorney, Agent, or Firm* — Blank Rome LLP

(57) ABSTRACT

A catalytic reactor comprises a floating particle catcher unit and a particle catching surface which extracts particles from the fluid flow stream above the catalyst bed whereby at least a part of the particles settles on the particle catching surface instead of clogging the catalyst bed.

19 Claims, 5 Drawing Sheets

(58) Field of Classification Search
CPC .... B01J 2219/00049; B01J 2219/00245; B01J 2219/00247; B01J 2219/00252
See application file for complete search history.

(56) References Cited

U.S. PATENT DOCUMENTS

2009/0177023 A1   7/2009  Koudil et al.
2014/0231309 A1   8/2014  Bazer-Bachi et al.

FOREIGN PATENT DOCUMENTS

| WO | WO 2018/001694 A1 | 1/2018 |
| WO | WO 2019/011724 A1 | 1/2019 |
| WO | WO 2019/086271 A2 | 5/2019 |

\* cited by examiner

CATALYTIC REACTOR WITH FLOATING PARTICLE CATCHER

This application is a national stage application claiming priority to PCT/EP2020/067178, now WO2020/260157, filed on Jun. 19, 2020, which claims priority to Danish Patent Application Serial No. DKPA 20019 00790, filed on Jun. 37, 2019.

FIELD OF THE INVENTION

This invention relates to a catalytic chemical reactor with particle separation. More specifically the invention relates to a reactor with a particle separator which is supported by the catalytic bed within the reactor and therefore is very easy to install and does not require support structures fixed to the reactor. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Particle separation and classification are well explored needs of the chemical, pharmaceutical, mineral and food industries. While particle classification in industrial processes may be required to improve the quality of a certain product, particle separation may be necessary to purify a fluid stream or to avoid problems to process equipment.

Sometimes particles are intentionally present in the process stream. This is for example the case of combustion processes based on pulverised fuels or production of pharmaceutical or specialty chemicals using powder technology. In other cases, the presence of particles is unintentional. This is for example the case of some refineries streams, effluents from fluidized beds, product streams from Fischer Trofispsch reactors. Particles may have various origins: they may be part of the original feedstock and other reactant streams or they may be generated in and collected from process equipment, for example as erosion products. Particles may be solid or liquid, may have organic nature, like char, coke and gums, or inorganic nature, like salts, debris or corrosion and erosion as iron components, or debris of catalyst particles. They may be liquid, as some aqueous mists, and containing living impurities as bacteria. Shape and size may also vary greatly—from sphere to flakes, from millimetres to a few microns or less. If the particles are unwanted in the downstream process, often, a filter, or other suitable particle separation technology known in the art, removes large part of these particles prior to sensitive equipment. However, in certain processes, the problem may appear or become more severe over time, for example when erosion and corrosion are involved. Sometimes, installing a particle removing equipment as an independent unit operation prior to sensitive equipment is not possible in practice.

One specific example of problems generated by particles may be seen in naphtha hydrotreating. The feed to a hydrotreating reactor is sometimes laden with particles. When the particle laden feed is introduced into the hydrotreating reactor the particles tend to scale rapidly on the grading or the catalyst. Reactors may thus require frequent skimming of the affected layers of the bed to contain the pressure drop build-up in the reactor. A frequency of once every 5-6 months or even of once every 2-3 months for skimming is not uncommon.

A characterization of the particles affecting a naphtha hydrotreater is seldom available. In fact, the particles depend upon the naphtha feedstock or process related issues (rust, salts, gums, etc.). On-stream collection of the particles is typically not available. Thus, particle characterization relies on post-mortem analyses, which are affected by large uncertainties due to particle agglomeration and oxidation.

Similarly, process gas resulting from the regeneration of FCC (fluid catalytic cracking) catalyst is often laden with catalyst particles and catalyst debris. Such gas may be conveyed to a sulphur recovery unit, most commonly a Claus plant, for the recovery as elemental sulphur, or a WSA plant, for the recovery of sulphur as concentrated sulphuric acid. These are catalytic fixed bed reactors which are prone to plugging if exposed to a particle-laden feedstock. The particles commonly present at the exit of the FCC regenerator is generally in the 2-20-micron size range or below.

When installing particle catching equipment in catalytic chemical reactors, one challenge is often to support the particle catcher, because there may not be any support ring, brackets or other support possibilities present in the catalytic chemical reactor where the particle catcher needs to be installed. Especially when retrofitting existing catalytic chemical reactors, it is often not an option to install supports in the reactor as this may require welding or drilling of holes for bolts or other fixtures. Hence, there is a need for a catalytic chemical reactor comprising particle catching equipment, where the installation and supporting of the particle catching equipment does not require welding, drilling or other potential weakening of the chemical reactor structure.

U.S. Pat. No. 10,159,950 discloses a catalytic reactor comprising a particle separator which extracts particles from the fluid flow stream above the reactor internals by means which makes the fluid flow stream perform a radial outwards and upwards S-curve flow path, which enables the particles to be extracted and settle in a collection section with low flow activity and turbulence.

US2009177023 discloses a filtration tray for a fixed bed reactor with a co-current down-flow of gas and liquid.

The device can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

EP0358923 discloses a process and an apparatus for purifying a raw gas originating from the gasification of solids. In a process and apparatus for purifying raw gas from solids gasification, containing granular and dusty solids particles, a solution is to be found, by means of which solids particles of any size are largely removed from the raw gas before entry to downstream cooling devices. This is achieved when the raw gas is passed in a first purification stage from the gasification zone in a straight line in the direction of a gas-holding space, whereby the granular solids particles are precipitated at the bottom of the gas-holding space and then, in a second purification stage, the partially purified raw gas is laterally deflected from the gas-holding space and undergoes a change to a velocity reduced by a factor of at least 3 and, after a further gas deflection, is passed substantially in the vertical direction through a solids filter, where the dusty solids particles are removed from the raw gas.

In spite of the above mentioned known art, a need exists for a catalytic chemical reactor with a particle separator, a particle catcher which ensures prolonged effective operation of the catalytic chemical reactor despite any particle impurities in the inlet fluid stream to the catalytic chemical reactor and which does not require installation of supports in the catalytic chemical reactor which may weaken the structure of the catalytic chemical reactor and if possible which further is cheap to produce and install and easy and fast to install and service.

SUMMARY OF THE INVENTION

The present invention describes a novel catalytic chemical reactor with a catalyst bed and comprising a particle separation system, for removing particles and impurities from the inlet process gas before it reaches and may clog the catalyst bed.

According to the invention, particles are separated from a flowing fluid stream by trapping them in a sedimentation region. Trapping of the particles is obtained by applying an S-shaped flow to the fluid stream in the particle separator. When the fluid stream performs the S-curved flow path, the particles may be flung outwards and by gravity downwards and settle in a part of the separator with low fluid flow activity.

The particle separator is one or more particle catcher units which are installed in the catalytic reactor, floating supported on the catalyst bed. This means that the particle catcher units do not need to be supported by structures attached to the reactor construction, since it supports on the catalyst bed which again is supported by the reactor construction. The particle catcher unit comprises a base section with a base section top surface, bottom surface a screen and a particle catcher unit outlet. The base section bottom surface is adapted to floating support on the catalyst bed, i.e. it has a surface area which is large enough and geometrically and structurally stable enough to carry the particle catcher unit on the catalyst without sinking in or braking the catalyst particles.

The floating particle catcher unit further comprises a channel comprising a particle catcher unit inlet for process gas locate in the upper portion of the channel. The channel is mechanically connected to the base section and is constructed to allow the process gas to flow in through particle catcher unit inlet, downwards through the channel, from the channel to the base section and evenly distributed from the base section to the catalyst bed via the particle catcher unit outlet provided with the screen. The screen which covers the particle catcher unit outlet has apertures with a total area which allows a free flow of the process gas from the particle catcher unit to the catalyst bed, but with a maximum open distance which is smaller than the size of the catalyst pellets. The particle catcher units may support floating on top of the catalyst bed or partly embedded in the catalyst bed, as long as the particle catcher unit inlet is arranged above the upper surface of the catalyst bed. A particle catching surface arranged above and adjacent to the top of the catalyst bed ensures that the particles which are separated from the process gas are caught and kept above and clear of the catalyst bed as they settle in the zone between the channels and below the particle catcher unit inlets. The particles will rest on the particle catching surface where they may be kept until removal during service, while the process gas may still flow freely through the particle catcher unit and be evenly distributed to the catalyst bed. The particle catching surface may be any suitable material such as a sheet material or a mat e.g. a glass filter mat which is adapted to fit the inner circumference of the catalytic reactor above the catalyst bed and with apertures to allow the channels to protrude up through the particle catching surface. Hence, as compared to known solutions this provides a catalytic reactor comprising a simple and cheap to produce floating particle catcher unit, which furthermore is very simple to install, can be lifted by hand and, very important, which does not require any structural supports to be fitted to the catalytic reactor.

In an embodiment of the invention, the channel and the base section are separate units which are releasable connected together by one or more channel attachments. The channel attachments may be any known art attachment, such as screws and bolts and it may be tailored quick release attachments which ensures easy and quick installation and service with the need for only a minimum of tools. To provide the floating particle catcher unit in separate units ensures ease of handling, as each part has a lower weight than the entire unit. Furthermore, it may ensure that installation through existing man-ways or other openings in the catalytic reactor is possible. Also the base section may comprise a plurality of parts. In one embodiment, it comprises a base section main element which connects to the channel and one or more base section sub elements connected to the base section main element. The base section elements may be connected by means of one or more sub element attachments which also may be any known or tailored connection means. It may also be a hinged connection whereby the base section elements may not need to be totally disconnected for installation, but simply collapsed, by bending over the hinged connections, to minimize the outer dimensions of the base section during installation. All surfaces of the section may comprise the screen which allows for the free and evenly distributed flow of process gas from the floating particle catcher unit to the catalyst bed. As mentioned, the screen comprises apertures of dimensions which may vary from different applications as the apertures should have dimensions which ensures that catalyst pellets do not enter the particle catcher unit through the screen. The base section as well as the channel may have many different geometries and surfaces which are bended or flat and connected in different angles. The drawings in the following merely show some embodiments of the invention.

To further improve the ease of handling and installation, the particle catcher unit may comprise particle catcher lifting means. They may be of any known shape, handles, lifting lugs or the like to facilitate lifting by hand or lighter lifting aids. As already mentioned, the catalytic reactor may comprise one or more floating particle catcher units. The particle catcher units may be arranged in the upper part of the reactor and, in case of a dome shaped upper part of the reactor, within the dome. When there are more than one floating particle catcher units, they may be arranged in any pattern as best fit to the reactor internals and the function of particle catching and evenly process gas distribution. In an embodiment of the invention, the floating particle catcher units are arranged in an even pattern around the centre line of the catalytic reactor and around the central inlet diffusor which in some embodiments are arranged within the catalytic reactor and serves to distribute the process gas from the catalytic reactor inlet to the upper part of the catalytic reactor above the catalyst bed in a suitable fashion. The plurality of floating particle catcher units may be interlocked by means of a dedicated particle catcher fixture, they may be interlocked by means of beams or sheet connections between each of the floating particle catcher units, or they may be freely positioned and supported in position by means of the catalyst bed only. The floating particle catcher unit or units may cover an area of the catalyst bed which is more than 30% of the total area of the catalyst bed itself. In an embodiment, the position of the floating particle catcher units is further stabilized by means of downward projecting fins fixed to the bottom surface of the base section. These fins may also serve the purpose of standing legs of the floating particle catcher unit when supported on a hard surface before installation. The catalytic reactor may in a specific embodiment be a hydroprocessing reactor.

FEATURES OF THE INVENTION

1. Catalytic reactor comprising a catalyst bed, said reactor comprising at least one floating particle catcher unit which is a combined particle catcher and fluid distributor, adapted to catch particles and impurities from process fluid entering the catalytic reactor before they reach the catalyst bed and distribute the process fluid evenly to the top of the catalyst bed, said floating particle catcher unit comprises
    a base section comprising a base section top surface, a base section bottom surface adapted to floating support on the catalyst bed, a screen and a particle catcher unit outlet,
    a channel comprising a particle catcher unit inlet located in its upper portion,
    and a particle catching surface arranged above and adjacent to the top of the catalyst bed adapted to catch and support said particles and impurities
   wherein the channel is mechanically connected to the base section and adapted to allow fluid flow from the particle catcher unit inlet, through the channel, further through the base section which distributes the process fluid evenly to the catalyst bed through the particle catcher unit outlet which is covered by the screen and the floating particle catcher unit is supported by the catalyst bed.
2. Catalytic reactor according to feature 1, wherein the base section is embedded into the catalyst bed.
3. Catalytic reactor according to any of the preceding features, wherein the particle catching surface is a sheet or mat arranged on top of the catalyst bed and on top of the base section or a sheet or mat arranged on top of the catalyst bed and connected to the base section.
4. Catalytic reactor according to feature 1, wherein the particle catching surface is a mat arranged on top of the catalyst bed and on top of the base section with cut out for the channel to protrude through, whereby said mat is covering the entire surface of the catalyst bed and the base section except for the area where the channel protrudes up through the cut out in the mat.
5. Catalytic reactor according to any of the preceding features, wherein the channel and the base section are separate units which are releasable connected to each other by at least one channel attachment.
6. Catalytic reactor according to any of the preceding features, wherein the base section comprises a base section main element connected to the channel and one or more base section sub elements connected to the base section main element.
7. Catalytic reactor according to feature 6, wherein the base section sub element is connected to the base section main element by means of at least one sub element attachment.
8. Catalytic reactor according to feature 7, wherein the sub element attachment comprises at least one releasable hinge, enabling the base section to be folded for install and service in the particle separating catalytic reactor.
9. Catalytic reactor according to any of the preceding features, wherein the base section bottom surface comprises said screen or wherein the base section top surface comprises said screen or wherein the base section top surface and the base section bottom surface comprises said screen.
10. Catalytic reactor according to any of the preceding features, wherein the base section comprises at least one base section side and wherein said base section side comprises said screen.
11. Catalytic reactor according to any of the preceding features, wherein the floating particle catcher unit comprises particle catcher lifting means.
12. Catalytic reactor according to any of the preceding features, comprising a plurality of floating particle catcher units.
13. Catalytic reactor according to feature 12, wherein the floating particle catcher units are arranged in an even pattern around the centre line of the particle separating catalytic reactor.
14. Catalytic reactor according to any of the preceding features, comprising a plurality of floating particle catcher units, where the total area of the base section bottom surface including any screen is larger than 30% of the total cross sectional area of the catalyst bed.
14. Catalytic reactor according to any of the preceding features, wherein the screen comprises a plurality of apertures of any shape adapted to prevent catalyst to enter into the floating particle catcher unit.
15. Catalytic reactor according to any of the preceding features, wherein the screen comprises a plurality of apertures with an opening of maximum 10 mm across the surface of the screen, preferably an opening of maximum 5 mm across the surface of the screen, preferably an opening of maximum 3 mm across the surface of the screen.
16. Catalytic reactor according to any of the preceding features, wherein the base section bottom surface comprises downward projecting fins to stabilize the floating particle catcher unit during installation and production.
17. Catalytic reactor according to any of the preceding features, wherein the reactor has a dome shaped upper part, the floating particle catcher unit is located beneath or within the lower part of the dome.
18. Catalytic reactor according to any of the preceding features, wherein said catalytic reactor is a hydroprocessing reactor.

BRIEF DESCRIPTION OF THE DRAWINGS

The invention is further illustrated by the accompanying drawings showing examples of embodiments of the invention.

POSITION NUMBERS

01. Floating particle catcher unit (combined particle catcher and fluid distributor)
02. Base section
03. Channel
04. Base section main element.
05. Base section sub element.
06. Base section bottom surface
07. Base section top surface
08. Base section side
09. Screen.
10. Channel attachment.
11. Sub element attachment.
12. Particle catcher unit inlet.
13. Particle catcher unit outlet.
14. Channel transfer opening.
15. Base section transfer opening.
16. Particle catcher unit lifting means.
17. Inlet diffusor.
18. Particle catcher fixture.

DESCRIPTION OF THE DRAWINGS

Embodiments of the invention will be explained in more detail in the following with reference to the drawings as seen on FIG. 1 to FIG. 5.

Figure 1:
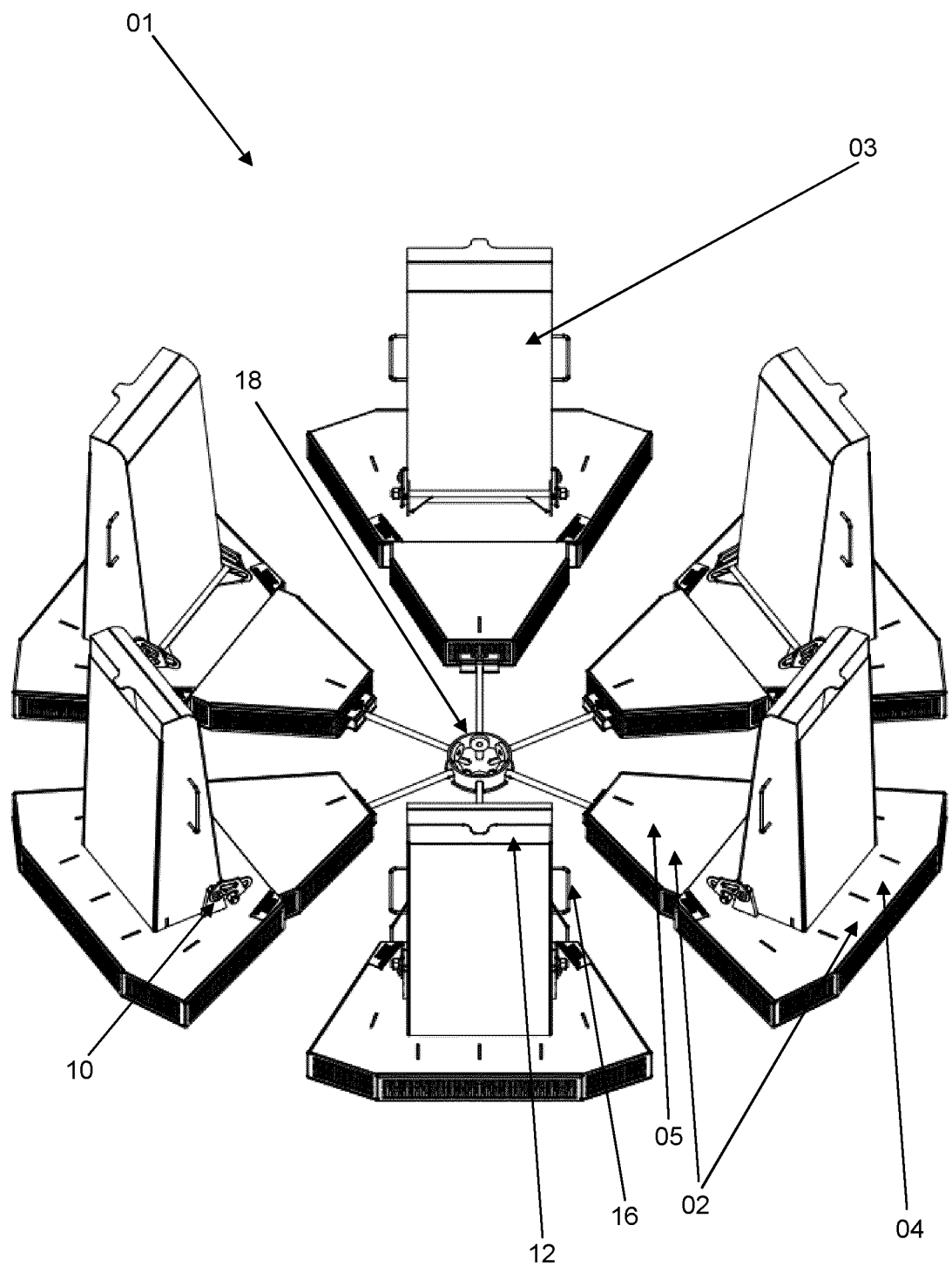
FIG. 1 shows an isometric view of the inside of a catalytic reactor (not shown) comprising a plurality of floating particle catcher units according to an embodiment of the invention.

In FIG. 1, a catalytic reactor (not shown) comprises a hollow top compartment where process gas enters. In this hollow space supported by the catalyst bed (not shown) a particle separating, floating particle catcher unit 01 may be installed, providing particle separation, particle catching and even process fluid distribution to the catalyst bed, without demanding extra space added to the catalytic reactor and without demanding any structural support, welding or drilling in the catalytic reactor. Each of the floating particle catcher units comprises a base section 02 and a channel 03. To provide ease of installation, the base section comprises two parts, a base section main element 04 and a base section sub element 05. The channel is connected structurally to the base section, more specifically to the base section main element, by means of channel attachments 10. and the channel also has a fluid connection to the base section whereby process fluid can flow from the particle catcher unit inlet 12, down through the channel and further to the base section. The floating particle catcher unit comprises two particle catcher unit lifting means 16, which provides more easy handling during service and installation. In the present embodiment, each of the six floating particle catcher units are fixed to a central placed particle catcher fixture 18 which helps to provide stabilization of the floating particle catcher units in an even pattern around the center line of the catalytic reactor. To ensure that most of the particle entering the catalytic reactor with the process fluid does not pass on to and clog the catalyst bed, a particle catching surface (not shown) is arranged on the surface of the catalyst bed and on top of the base sections of the floating particle catcher units with apertures tailored to fit around the channels so they may protrude up through the particle catching surface whereas the base sections remain below the particle catching surface.

Figure 5:
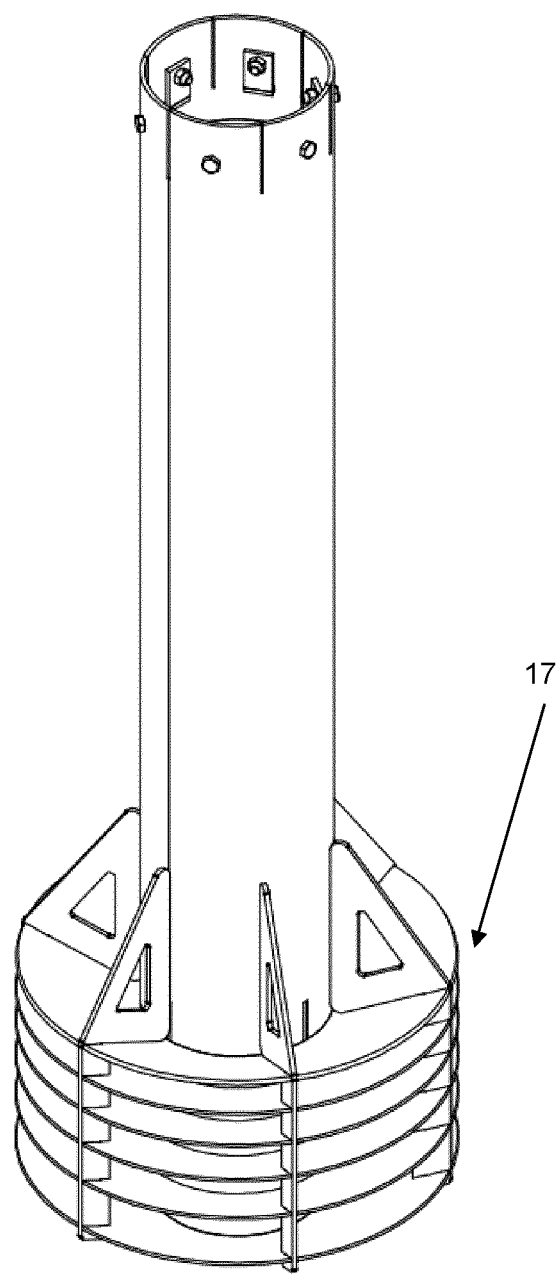
FIG. 5 shows an isometric side view of the inlet diffusor according to an embodiment of the invention.

An inlet diffusor 17 as seen on FIG. 5 may be arranged centrally in the upper part of the catalytic reactor, connected to the process fluid inlet of the catalytic reactor and adapted to pass the process fluid from the catalytic reactor inlet in an evenly distributed manner to a central point above the catalyst bed, from where it flows with decreasing flow speed to the particle catcher unit inlets. As the process fluid flow decreases, a part of the particles in the process fluid and with a higher density than the process fluid itself, settles on the particle catching surface before the process fluid enters the floating particle catcher unit and is pass on and evenly distributed to the catalyst bed via the base section.

Figure 2:
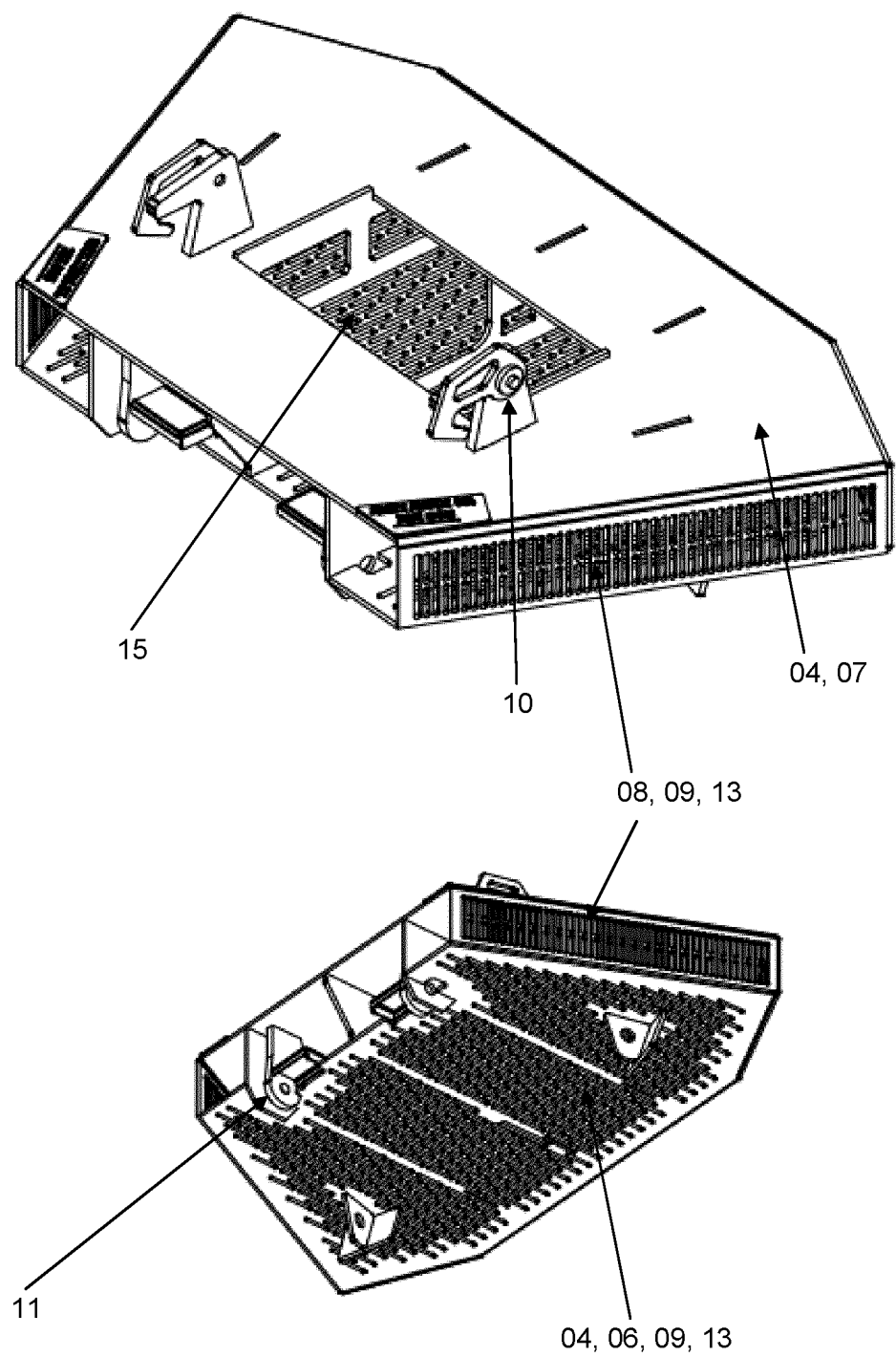
FIG. 2 shows an isometric top and bottom view of the base section main element according to an embodiment of the invention.
Figure 3:
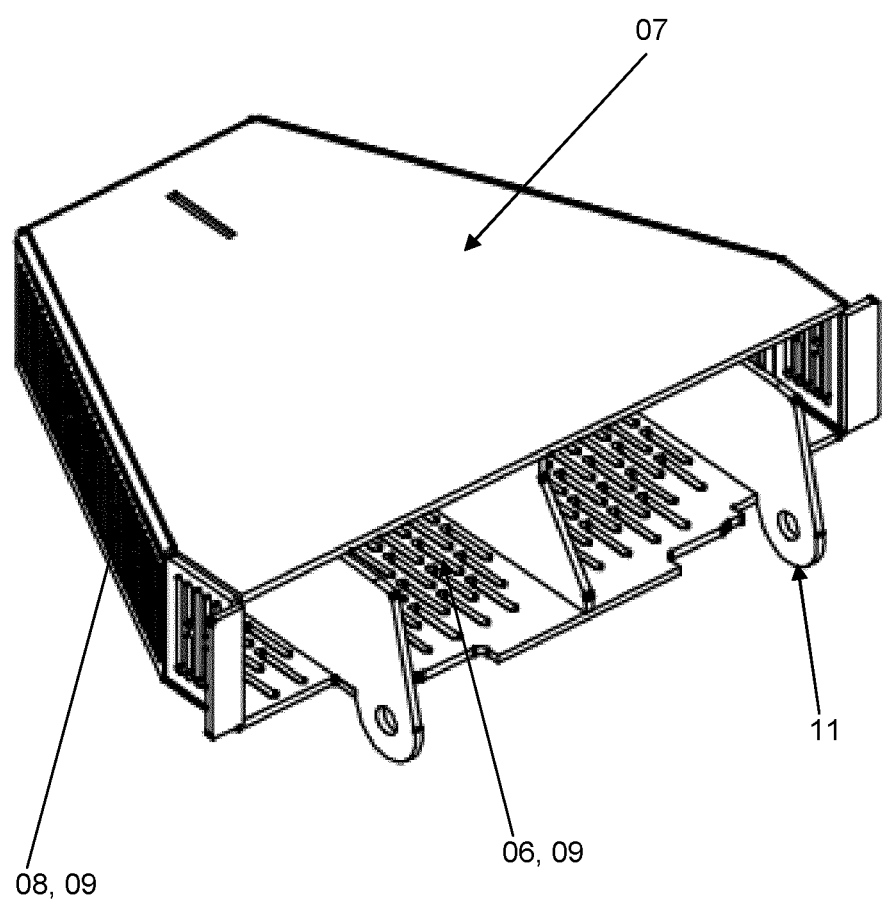
FIG. 3 shows an isometric top view of the base section sub element according to an embodiment of the invention.
Figure 4:
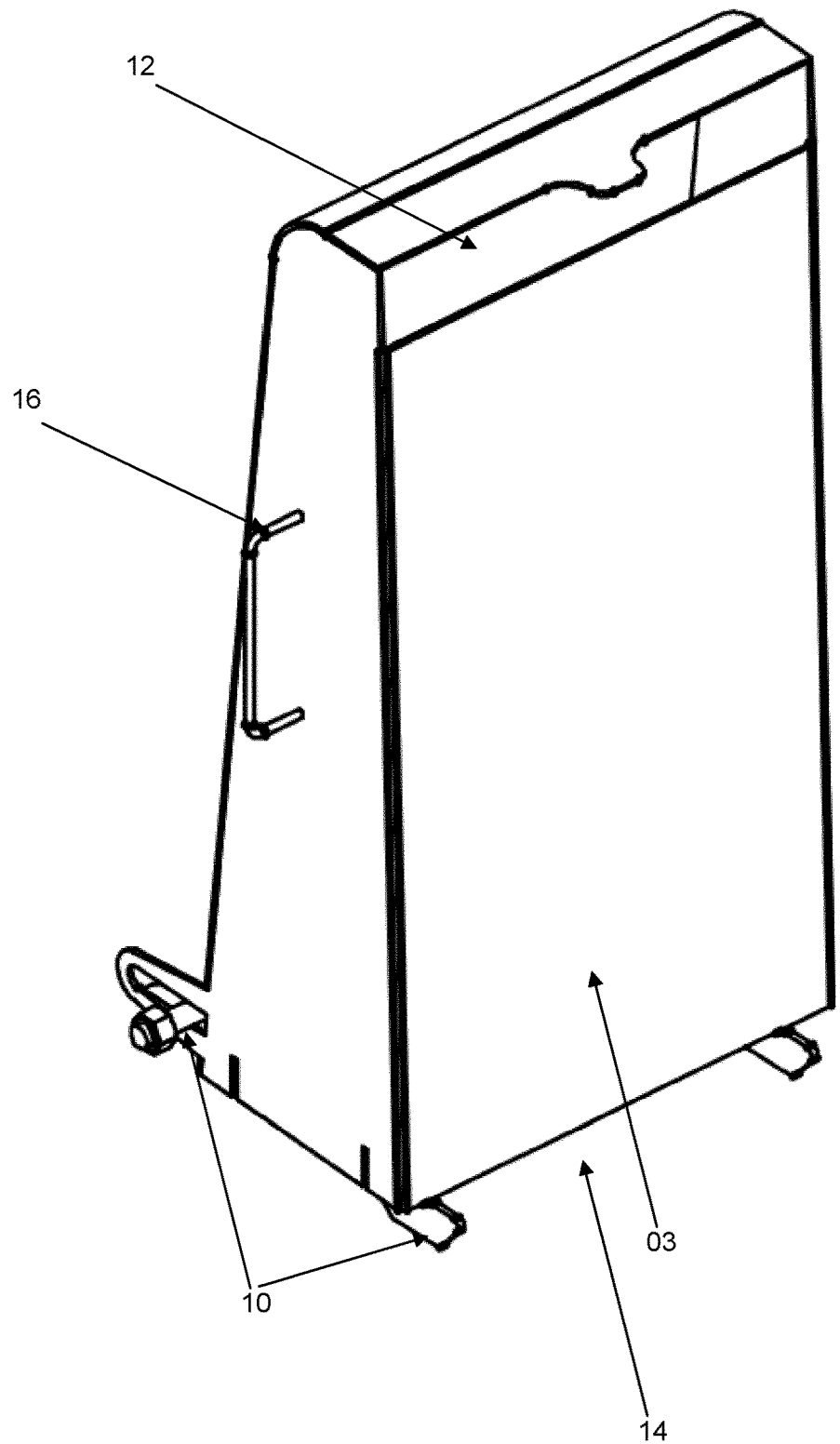
FIG. 4 shows an isometric side view of the channel according to an embodiment of the invention.

The features which provides this effect can be seen in more detail on FIG. 2, FIG. 3 and FIG. 4, where the channel transfer opening 14 (below the channel, not visible) and the base section transfer opening 15 provides the fluid connection between the channel and the base section, and the screen 09 which forms the particle catcher unit outlet 13 on the base section bottom surface 06 and the base section sides 08, whereby it is seen how process fluid can enter the floating particle catcher unit through the particle catcher unit inlet, flow down the inner hollow part of the channel pass to the base section via the channel- and base section transfer opening and distribute evenly to the catalyst bed through the large surface of the screened particle catcher unit outlet. The base section also has a base section top surface 07 on which the channel structurally attaches by means of the channel attachments. On the base section bottom surface, the sub element attachments 11 are located and provides for a hinged connection between the base section main- and sub element. During installation the main- and sub elements can thus be collapsed to approximately double the thickness but half the length of their dimensions when properly installed and thereby more easily pass through the openings of the catalyst reactor during installation.

The invention claimed is:

1. Catalytic reactor comprising a catalyst bed, said reactor comprising at least one floating particle catcher unit which is a combined particle catcher and fluid distributor, adapted to catch particles and impurities from process fluid entering the catalytic reactor before they reach the catalyst bed and distribute the process fluid evenly to the top of the catalyst bed, said floating particle catcher unit comprises:
   a base section comprising a base section top surface, a base section bottom surface adapted to floating support on the catalyst bed, a screen and a particle catcher unit outlet,
   a channel comprising a particle catcher unit inlet located in its upper portion, and
   a particle catching surface arranged above and adjacent to the top of the catalyst bed adapted to catch and support said particles and impurities,
   wherein the channel is mechanically connected to the base section and adapted to allow fluid flow from the particle catcher unit inlet, through the channel, further through the base section which distributes the process fluid evenly to the catalyst bed through the particle catcher unit outlet which is covered by the screen and the floating particle catcher unit is supported by the catalyst bed.

2. Catalytic reactor according to claim 1, wherein the base section is embedded into the catalyst bed.

3. Catalytic reactor according to claim 1, wherein the particle catching surface is a sheet or mat arranged on top of the catalyst bed and on top of the base section or a sheet or mat arranged on top of the catalyst bed and connected to the base section.

4. Catalytic reactor according to claim 1, wherein the particle catching surface is a mat arranged on top of the catalyst bed and on top of the base section with cut out for the channel to protrude through, whereby said mat is covering the entire surface of the catalyst bed and the base section except for the area where the channel protrudes up through the cut out in the mat.

5. Catalytic reactor according to claim 1, wherein the channel and the base section are separate units which are releasable connected to each other by at least one channel attachment.

6. Catalytic reactor according to claim 1, wherein the base section comprises a base section main element connected to the channel and one or more base section sub elements connected to the base section main element.

7. Catalytic reactor according to claim 6, wherein the base section sub element is connected to the base section main element by means of at least one sub element attachment.

8. Catalytic reactor according to claim 7, wherein the sub element attachment comprises at least one releasable hinge, enabling the base section to be folded for installation and service in the particle separating catalytic reactor.

9. Catalytic reactor according to claim 1, wherein the base section bottom surface comprises said screen or wherein the base section top surface comprises said screen or wherein the base section top surface and the base section bottom surface comprises said screen.

10. Catalytic reactor according to claim 1, wherein the base section comprises at least one base section side and wherein said base section side comprises said screen.

11. Catalytic reactor according to claim 1, wherein the floating particle catcher unit comprises particle catcher lifting means.

12. Catalytic reactor according to claim 1, comprising a plurality of floating particle catcher units.

13. Catalytic reactor according to claim 12, wherein the floating particle catcher units are arranged in an even pattern around the center line of the particle separating catalytic reactor.

14. Catalytic reactor according to claim 1, comprising a plurality of floating particle catcher units, where the total area of the base section bottom surface including any screen is larger than 30% of the total cross sectional area of the catalyst bed.

15. Catalytic reactor according to claim 1, wherein the screen comprises a plurality of apertures of any shape adapted to prevent catalyst to enter into the floating particle catcher unit.

16. Catalytic reactor according to claim 1, wherein the screen comprises a plurality of apertures with an opening of maximum 10 mm across the surface of the screen.

17. Catalytic reactor according to claim 1, wherein the base section bottom surface comprises downward projecting fins to stabilize the floating particle catcher unit during installation and production.

18. Catalytic reactor according to claim 1, wherein the reactor has a dome shaped upper part, the floating particle catcher unit is located beneath or within the lower part of the dome.

19. Catalytic reactor according to claim 1, wherein said catalytic reactor is a hydroprocessing reactor.

* * * * *